United States Patent
Braun et al.

(10) Patent No.: US 11,186,292 B1
(45) Date of Patent: *Nov. 30, 2021

(54) SYSTEMS AND METHODS FOR CONFIGURING A VEHICLE

(71) Applicant: United Services Automobile Association (USAA), San Antonio, TX (US)

(72) Inventors: Florian Braun, San Antonio, TX (US); Andre Rene Buentello, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 314 days.

This patent is subject to a terminal disclaimer.

(21) Appl. No.: 16/282,206

(22) Filed: Feb. 21, 2019

Related U.S. Application Data

(63) Continuation of application No. 15/254,457, filed on Sep. 1, 2016, now Pat. No. 10,252,727.

(60) Provisional application No. 62/214,284, filed on Sep. 4, 2015.

(51) Int. Cl.
*B60W 50/12* (2012.01)
*G06Q 40/08* (2012.01)

(52) U.S. Cl.
CPC ............ *B60W 50/12* (2013.01); *G06Q 40/08* (2013.01); *B60W 2540/043* (2020.02)

(58) Field of Classification Search
CPC . B60W 50/12; B60W 2540/043; G06Q 40/08
See application file for complete search history.

(56) References Cited

U.S. PATENT DOCUMENTS

| | | | |
|---|---|---|---|
| 6,232,874 B1 | 5/2001 | Murphy | |
| 6,505,780 B1 | 1/2003 | Yassin | |
| 9,067,565 B2 | 6/2015 | McClellan | |
| 9,754,425 B1* | 9/2017 | Iqbal | B60W 40/09 |
| 9,946,531 B1* | 4/2018 | Fields | G05D 1/0278 |
| 10,252,727 B1 | 4/2019 | Braun et al. | |
| 2010/0131305 A1 | 5/2010 | Collopy | |
| 2012/0109692 A1 | 5/2012 | Collins | |
| 2014/0218170 A1 | 8/2014 | Felkins | |
| 2015/0088550 A1 | 3/2015 | Bowers | |
| 2016/0203560 A1 | 7/2016 | Parameshwaran | |

OTHER PUBLICATIONS

U.S. Appl. No. 15/254,457, filed Sep. 1, 2016, Systems and Methods Configuring a Vehicle.
U.S. Appl. No. 62/214,284, filed Sep. 4, 2015, Systems and Methods Configuring a Vehicle.

* cited by examiner

*Primary Examiner* — Nadeem Odeh
(74) *Attorney, Agent, or Firm* — Perkins Coie LLP

(57) ABSTRACT

Methods and systems described in this disclosure identify a driver of a vehicle. The driver may have a profile indicating vehicle settings, and at least one of the vehicle settings may not be overridden by the driver. The vehicle may be configured according to the vehicle settings in the profile, such that the vehicle may not operate outside of at least one of the vehicle settings that cannot be overridden. An insurance rate for insuring the vehicle may be generated based at least in part on the vehicle settings associated with the profile.

18 Claims, 6 Drawing Sheets

SYSTEMS AND METHODS FOR CONFIGURING A VEHICLE

CROSS-REFERENCE TO RELATED APPLICATIONS

The present application is a continuation of U.S. patent application Ser. No. 15/254,457, titled "Systems and Methods For Configuring A Vehicle", filed on Sep. 1, 2016, now allowed; which is a non-provisional of and claims priority to U.S. Provisional Application No. 62/214,284, filed on Sep. 4, 2015, entitled "SYSTEMS AND METHODS FOR CONFIGURING A VEHICLE," each of which are hereby incorporated by reference in their entireties for all purposes.

TECHNICAL FIELD

Various embodiments of the present disclosure generally relate to vehicles. More specifically, various embodiments of the present disclosure relate to methods and systems for configuring a vehicle.

BACKGROUND

Insurance companies often base vehicle insurance rates on numerous factors, such as driving history, age, type of vehicle, amount of coverage, and location. The more risk the insurance company incurs by insuring the vehicle, the higher the premium. Some factors are environmental factors and cannot be controlled by the insured. For example, insurance is more expensive in certain states because more accidents occur in those states.

BRIEF DESCRIPTION OF THE DRAWINGS

Embodiments of the present disclosure will be described and explained through the use of the accompanying drawings in which.

DETAILED DESCRIPTION

Figure 1:
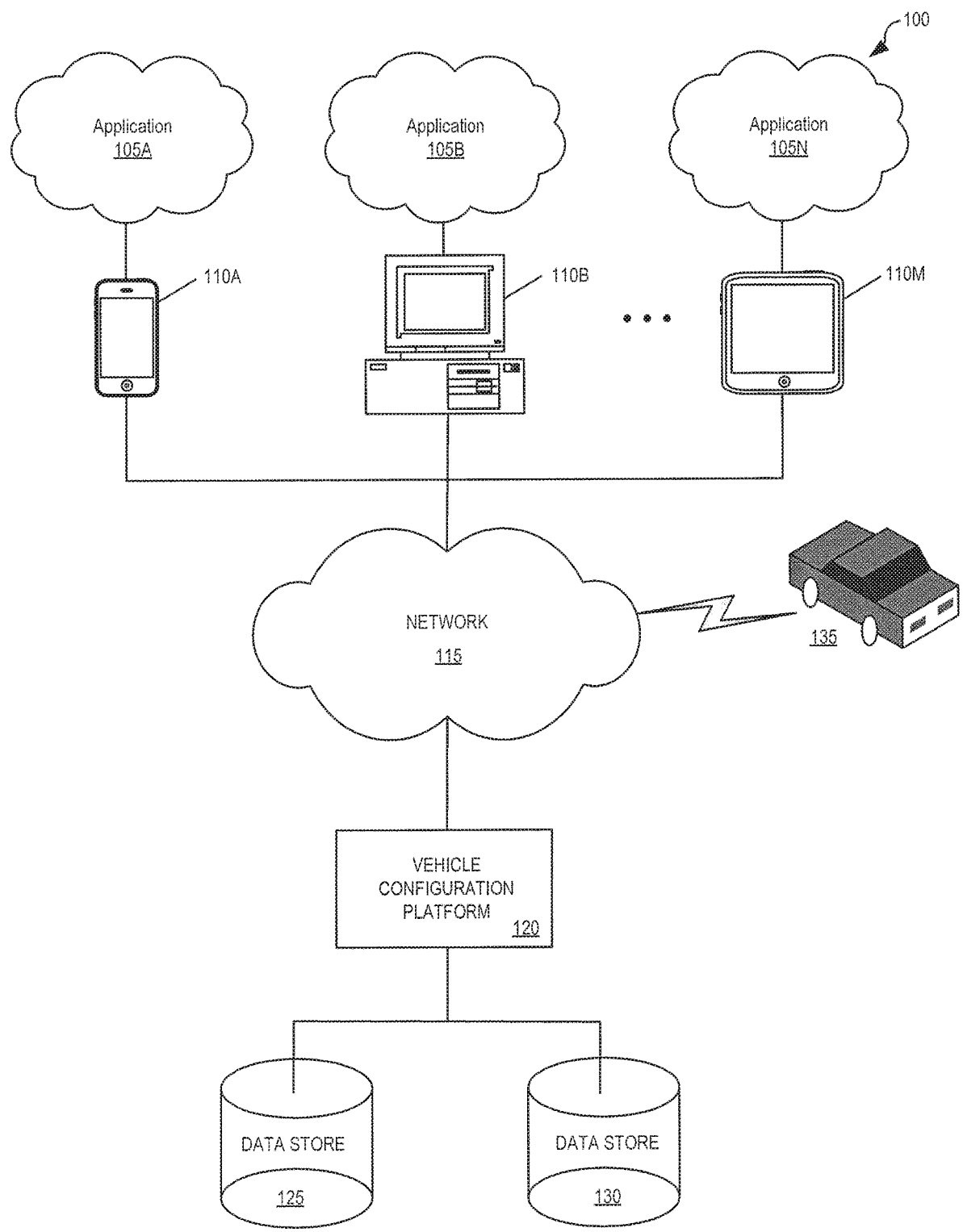
FIG. 1 illustrates an example of a network-based operating environment in accordance with various embodiments of the disclosure.

Various embodiments of the present disclosure generally relate to vehicles. More specifically, various embodiments of the present disclosure relate to methods and systems for configuring a vehicle.

Today, some insurance companies offer products that monitor driving habits of the driver to determine a risk of insuring the driver. Insurance rates can then be adjusted to account for this risk (e.g., the higher the risk, the higher the rate). For example, a speed or brake sensor may monitor and transmit the insured's average speed or pressure applied to brake to the insurance company. If the insured keeps speeds low and does not slam on the brakes, the insured may be offered lower insurance rates. This approach, while helpful in rewarding good drivers, does not prevent dangerous driving or improve driving habits.

Methods and systems disclosed herein allow users and/or insurance companies to configure a vehicle to prevent high risk driving, allowing for lower insurance rates. For example, a driver may select vehicle configurations, which, if accepted by the insurance company, become part of the vehicle insurance policy. The policy rate for the vehicle may depend on the vehicle configurations designated in the policy. The vehicle may then be configured such that the driver is prevented from changing the level of the features as designated in the policy. Features that can be configured include stereo volume limit, speed limit (e.g., based on speed limit on particular street), gas light indication level, lights, number of passengers, radius or location of travel, distance from other vehicles, driving after a certain time or darkness level, and temperature. The driver will be prevented from violating the configured vehicle settings. The vehicle and/or server may monitor the vehicle to record instances of the driver attempting to override one of the configured parameters. In some embodiments, when there is an attempted override (i.e., driver is within a threshold of exceeding the vehicle setting), a message may be sent to the policyholder alerting them policyholder and/or asking whether the policy owner wants to change the policy. A message may also be sent to the driver (e.g., via the vehicle or a mobile device) alerting the driver about the vehicle setting.

In some embodiments, more than one driver may be insured to drive the vehicle. Each driver may have their own profile with their individual configurations. Thus, before beginning to drive the vehicle, the driver may be identified (e.g., via a key, biometrics, weight), and the vehicle can be configured for the appropriate driver. In some embodiments, the driver may be identified using the driver's mobile device (e.g., mobile device is synced with vehicle and flail collects a fingerprint). In some embodiments, the vehicle is a self-driving vehicle (i.e., no human driver required). The insurance premiums may depend on the configurations set for the self-driving vehicle.

In some embodiments, some configurable features may be identified as over-ridable features in the insurance policy such that the driver can override the feature, but it will result in a breach of the insurance policy and either a rate increase or a lack of coverage for a period of time or in a particular geographical location. Such features may be helpful in decreasing insurance rates for drivers who do not need as much insurance because the driver drives only a limited amount. For example, the insurance policy may be tailored to a particular driver's habits such as a teenager who is supposed to drive particular routes or not drive outside of a predetermined geographical region (e.g., school, sports practices, home). If the teenager drives the vehicle outside of the route or geographical region, the vehicle may allow the user to override the configuration (i.e., the vehicle will not shut off if driven outside of the predefined area), but the incident will be reported to the insurance company. In some embodiments, the driver may be given a warning (e.g., via the vehicle, via a user device) that the user is approaching a breach of the insurance contract or that the user will not be insured outside of a certain area. In some embodiments, the policyholder may be asked whether to increase the policy for a fee if the policy does not automatically increase.

This disclosure describes vehicle configuration processes designed to increase safety by preventing dangerous driving habits in humans and in autonomous driving vehicles. Various embodiments may provide one or more of the following technological improvements: 1) improved monitoring of configured vehicle settings in insured property, 2) improved processes for overriding certain vehicle settings and disallowing an override of other vehicle settings, 3) improved accuracy and efficiency in designing and pricing vehicle insurance policies, and 4) improved communication between the policyholder and the insurance company.

In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details. For example, configurations for autonomously/self-driving vehicles are contemplated by this disclosure.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to vehicle 135, vehicle configuration platform 120, and data stores 125 and 130.

Computing devices 110A-110M may be configured to communicate via the network 115 with vehicle configuration platform 120. In some embodiments, computing devices 110A-110M can retrieve or submit information to vehicle configuration platform 120 and run one or more applications with customized content retrieved by vehicle configuration platform 120 and data stores 125 and 130. For example, computing devices 110A-110M can execute a browser application or a customized client to enable interaction between the computing devices 110A-110M, vehicle configuration platform 120, and data stores 125 and 130.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Vehicle configuration platform 120 can be running on one or more servers and can be used to receive vehicle configurations, configure vehicles, create driver profiles, create insurance policies, monitor vehicles, send warnings to drivers or policyholders, determine rates, send policy updates, store profiles and/or policies in data stores 125 and 130, and/or perform other activities. In some embodiments, vehicle configuration platform 120 includes various data processing and analytic tools that allow for insurance rate determination. In some embodiments, vehicle configuration platform 120 is a server.

Vehicle configuration platform 120 may be communicably coupled with vehicle 135, data stores 125 and 130 and computing devices 110A-110M and may communicate, access, or receive data (e.g., driver identification, vehicle configurations, vehicle driving data, vehicle locations, driver profiles, insurance rates) from vehicle 135, computing devices 110A-110M and data stores 125 and 130. Vehicle configuration platform 120 may be associated with a membership organization, and the drivers may be members of the membership organization. The organization may be a financial institution and/or an insurance company.

Vehicle configuration platform 120 may be customized or calibrated by individual companies or service providers based on user needs and/or business objectives. For example, companies may have different business rules, and/or different criteria for determining configurations and insurance rates.

Data stores 125 and 130 can be used to manage storage and access to user data such as driver history, insurance policies, registered user devices, configuration profiles, type and number of vehicles insured, payment history, outstanding bills, and other information. Data stores 125 and 130 may be a data repository of a set of integrated objects that are modeled using classes defined in database schemas. Data stores 125 and 130 may further include flat files that can store data. Vehicle configuration platform 120 and/or other servers may collect and/or access data from the data stores 125 and 130.

Vehicle 135 may be any type of configurable vehicle, meaning that at least one feature of the vehicle may be configured such that the driver cannot override the feature without a policy update. Vehicle 135 may also include features that are designated as over-rideable. Features that may be configurable include speed (e.g., sets a maximum speed based on type of surface/road), lights (e.g., turn on during bad driving weather, at all times, dusk/dawn), low gas indicator (e.g., turn on earlier than typical low gas indicator), stereo volume (e.g., set a maximum level), a requirement that all safety features in the vehicle cannot be deactivated, radius of travel (e.g., vehicle cannot leave certain radius), time of day (e.g., cannot drive after 10 p.m. or before 5 a.m.), distance from other vehicles, and designation of routes. In some embodiments, the vehicle is completely self-driving (i.e., no human driver) and can include configurable settings that a human (e.g., using a remote device) can adjust.

Vehicle 135 may include sensors/detectors or a network of sensors/detectors to detect the vehicle's operational status. For example, vehicle 135 may be equipped with a sensor to monitor the headlight status. For any vehicle settings that are over-rideable, the sensor may detect when over-rideable vehicle settings are within a predetermined distance/threshold of being overridden or have been overridden. In some embodiments, the sensors collect data and provide the data to the vehicle and/or to vehicle configuration platform 120.

Figure 2:
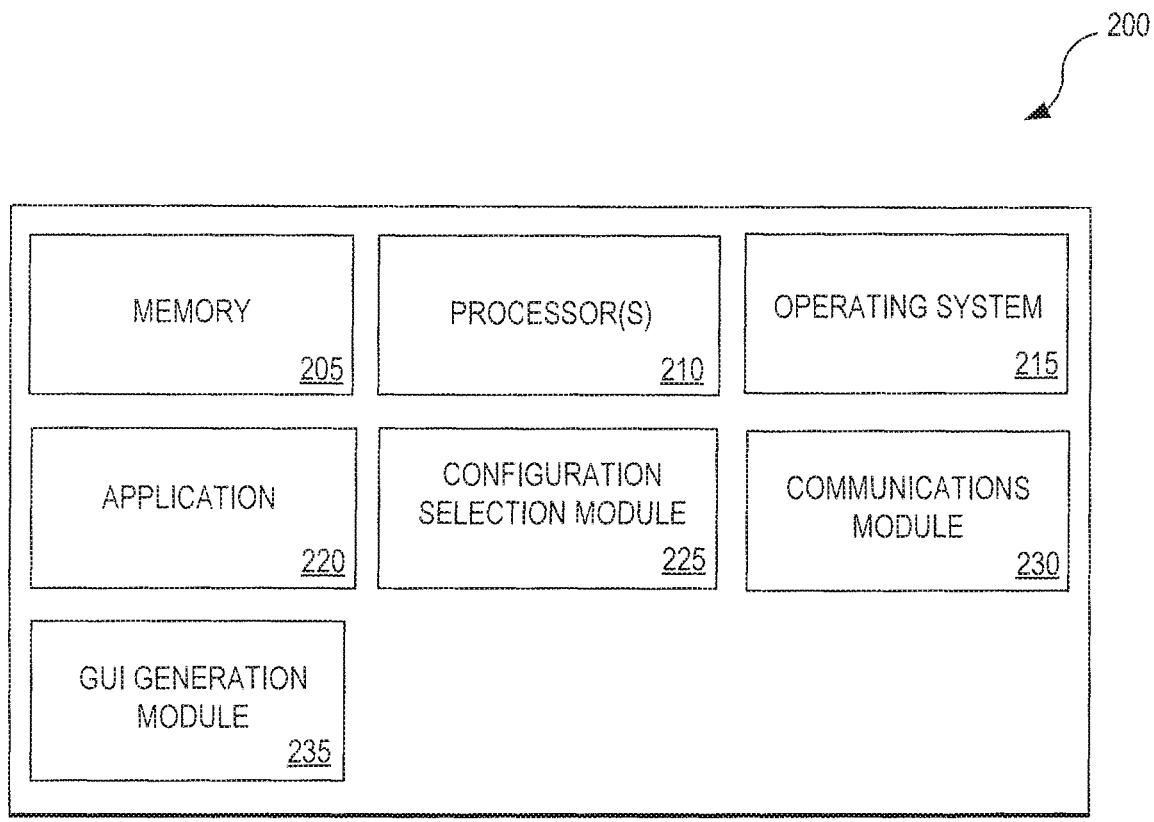
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, configuration selection module 225, communications module 230, and graphical user interface (GUI) generation module 235. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220 and configuration selection module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, configuration selection module 225, communications module 230, and GUI generation module 235.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with vehicle configuration platform 120. For example, application 220 can include an application for financial services, a money transfer application, a social networking application, and a gaming application.

Application 220 can access a server and/or a platform associated with an organization (e.g., vehicle configuration platform 120) to retrieve insurance account/policy details, receive warnings, make payments, and identify the driver for the organization. For example, application 220 may be used to identify a person as a driver. The driver could place device 110 into a position in the vehicle and identify the driver using biometrics or other means. Or, the driver could be identified using geolocation or cell phone triangulation. In some embodiments, device 110 sends a signal to a vehicle and/or to the server when device 110 detects that the user is in the driver's seat. In some embodiments, application 220 may collect biometric samples to identify the driver such as a voice, eye movement, fingerprints, behavioral biometrics (e.g., keystrokes), etc.

Configuration selection module 225 may present a host of configurable features for a vehicle. The configurable features may include when to have headlights on, number of passengers, maximum speeds, and stereo volume. The user may be an insured driver or a driver who is shopping for insurance. The features may be selectable in various ways. For example, some features may include a "on/off" sliding selection. Other features may be indicated by a level (e.g., level of volume of the stereo). Configuration selection module 225 may provide insurance estimates or indicate the change in insurance rates when the user selects a feature on/off or selects a particular level for the feature. For example, as the user slides the stereo level up, the user may watch the insurance premium increase. The user can make these selections on a per insured driver, per vehicle basis. Once the user finalizes the configurations, the user can select a submit button or other button indicating a confirmation of the selections, creating at least part of a binding insurance policy with the user.

Communications module 230 can exchange communication with the vehicle (e.g., vehicle 135) and/or a server (e.g., vehicle configuration platform 120). For example, communications module 230 may send a communication to vehicle configuration platform 120 or vehicle 135 communicating the identity of the person driving so the vehicle can be configured according to the profile of the driver. In some embodiments, communications module 230 communicates vehicle settings to vehicle 135 and/or vehicle configuration platform 120. Communications module 230 can receive a warning from vehicle configuration platform 120 or vehicle 135 warning the driver and/or the insured that the driver is nearing one of the configured vehicle settings or boundaries (e.g., geographical boundaries) that can be overridden by the driver.

GUI generation module 235 can generate one or more GUI screens that allow for interaction with a user. In at least one embodiment, GUI generation module 235 generates a graphical user interface receiving and/or conveying information to the user. For example, the GUI generation module 235 may display information regarding the current configurations for the user or vehicle (e.g., in the case of a self-driving vehicle).

Figure 3:
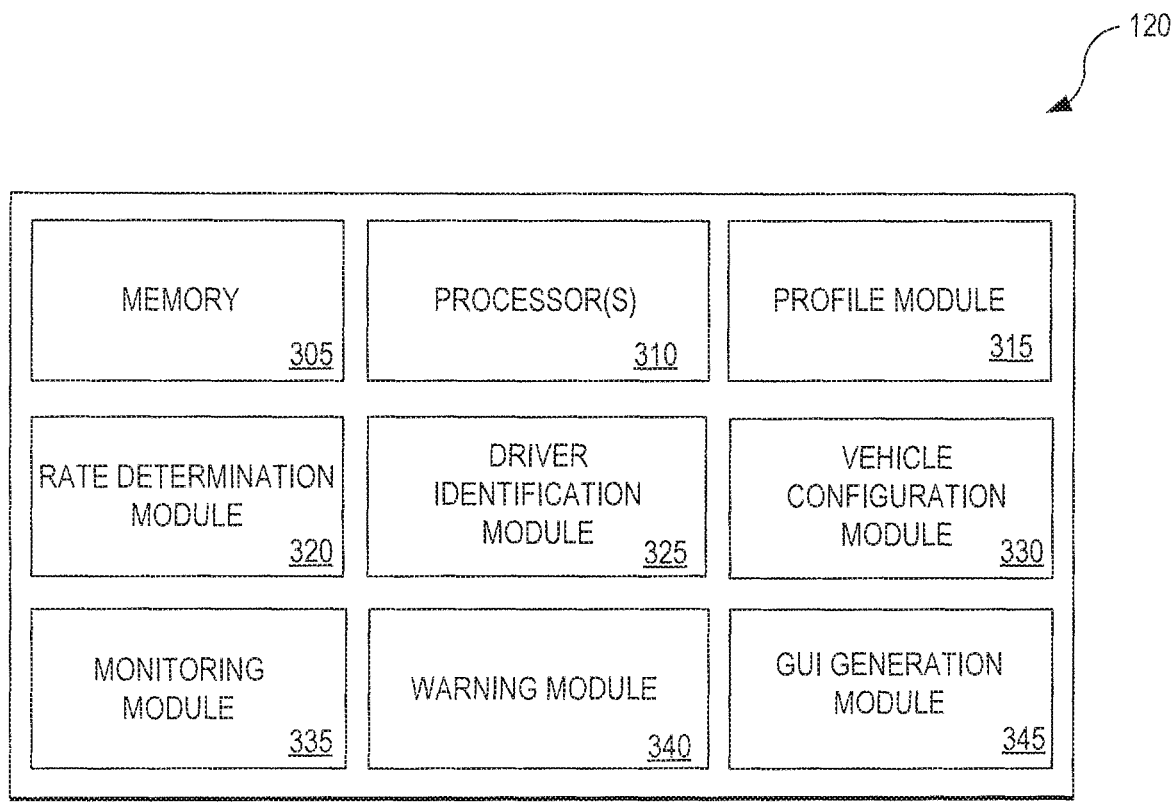
FIG. 3 illustrates various components of a vehicle configuration platform that may be used in accordance with various embodiments of the present disclosure.

FIG. 3 illustrates a set of components within vehicle configuration platform 120 according to one or more embodiments of the present disclosure. According to the embodiments shown in FIG. 3, vehicle configuration platform 120 can include memory 305, one or more processors 310, profile module 315, rate determination module 320, driver identification module 325, vehicle configuration module 330, monitoring module 335, warning module 340, and GUI generation module 345. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute functionality profile module 315, rate determination module 320, driver identification module 325, vehicle configuration module 330, monitoring module 335, warning module 340, and GUI generation module 345.

Profile module 315 can create profiles for insured drivers that reflect the vehicle configurations (i.e., vehicle settings) for that driver. Profiles may include any configurations such as maximum speeds (e.g., by street, region, zip code, overall), maximum number of passengers, maximum volume on the stereo, maximum temperature inside the vehicle, headlight status (e.g., on all the time, on when certain daylight is detected), and gas light indicator status (e.g., turn on with a quarter of a tank, half a tank). When a driver is identified as being the driver by driver identification module 325, the driver's profile can be selected and the vehicle can be configured for the identified driver by vehicle configuration module 330. In some embodiments, the configuration selections in the profile may be received and changed only from the policyholder or a device of the policyholder. This allows one party (e.g., parents) to set up profiles for a second party under the insurance policy (e.g., children) and not allow the second party to alter the settings and the policy. In some embodiments, completely self-driving vehicles (i.e., no human interaction needed) can be insured as well. The insurance premiums for the self-driving vehicle can vary with the limitations/configurations of the self-driving vehicle (e.g., maximum speed limit, geographical restrictions).

Rate determination module 320 can determine rates for insurance policies based on the configurations for the vehicle. If the policy is altered (i.e., if the vehicle configurations change, drivers are added, a person not on the policy drives the vehicle), the policy rate can increase or decrease depending on whether the change increased or decreases risk to the insurance company. If the vehicle configuration is changed (e.g., parent allows a child to drive after 10:00 p.m.), the insurance rate is altered. Vehicle configuration changes may be made via profile module 315 and/or received from configuration selection module 225.

Driver identification module 325 can determine an identity of a driver (or no human driver if the vehicle is self-driving). The identity of the driver may be received from the vehicle or a user device, or alternatively, identifying information may be received by driver identification module 325 and determined from the identifying information. The driver may be identified by the use of a particular key inserted in the vehicle, a selection from a list of drivers via the vehicle or a user device, a biometric sample (e.g., fingerprints on the steering wheel, a video or picture when the driver sits in the driver's seat, driver speaks), or location of a mobile device.

If driver identification module 325 receives identifying information but not an identity, then driver identification module 325 may compare the identifying information with stored information to determine the identity of the driver. When the driver's identity is known, and, in some cases, confirmed (e.g., by sending a communication to the supposed driver's or policyholder's mobile device), driver identification module 325 collects the driver's profile from profile module 315 so that the vehicle can be configured for the identified driver by vehicle configuration module 330. If the driver does not have a profile (i.e., the driver is not covered by the insurance policy or a configuration has not yet been chosen for the driver), then a set of default configurations may be employed or the driver may not be allowed to drive (i.e., the vehicle is configured not to start). If the driver is not covered, a communication may be sent to the policyholder to request confirmation that the driver can drive the vehicle and to confirm or select configurations.

Vehicle configuration module 330 can configure the vehicle for the driver. When the driver has an associated profile, the vehicle is configured to the settings in the profile. When the driver does not have an associated profile, the vehicle is configured consistent with the policyholder's rules. Some of the configured settings may be over-rideable whereas others are not. In some embodiments, the policyholder can select what features are over-ridable.

Monitoring module 335 can monitor the vehicle and determine when a setting is close to being overridden and/or is overridden. When the feature is over-ridable, the driver will not be prevented from overriding the setting, though the driver may be warned when after passing a predetermined threshold (e.g., the driver is within 2 miles of a geographic boundary). In some embodiments, the policyholder may receive a notification about the override and the resulting insurance rate increase. On the other hand, when the setting cannot be overridden, the driver is prevented from overriding the setting. In some embodiments, features such as geographical boundaries may be over-ridable during special circumstances. Monitoring module 335 can send a report summarizing overrides and/or attempted overrides.

Warning module 340 can notify the driver and/or the policyholder that the driver may override or has already overridden the over-ridable configurations. The message can be delivered to the vehicle and/or a device associated with the driver and/or policyholder. The message may provide an option for the policyholder to update the driver's configurations.

GUI generation module 345 is capable of generating one or more GUI screens that allow for interaction with a user. In at least one embodiment, GUI generation module 345 generates a graphical user interface receiving and/or conveying information to the user. For example, GUI generation module 345 may display the terms of the coverage of the insured, including the configurations of the vehicle for each driver insured under the policy, the warnings that have been sent, and a location of the vehicle.

Figure 4:
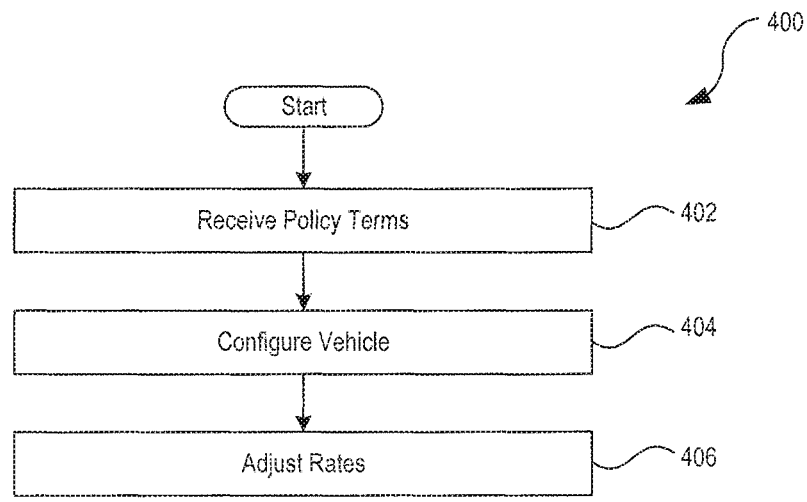
FIG. 4 is a flowchart illustrating a set of operations for configuring a vehicle in accordance with various embodiments of the disclosure.
Figure 5:
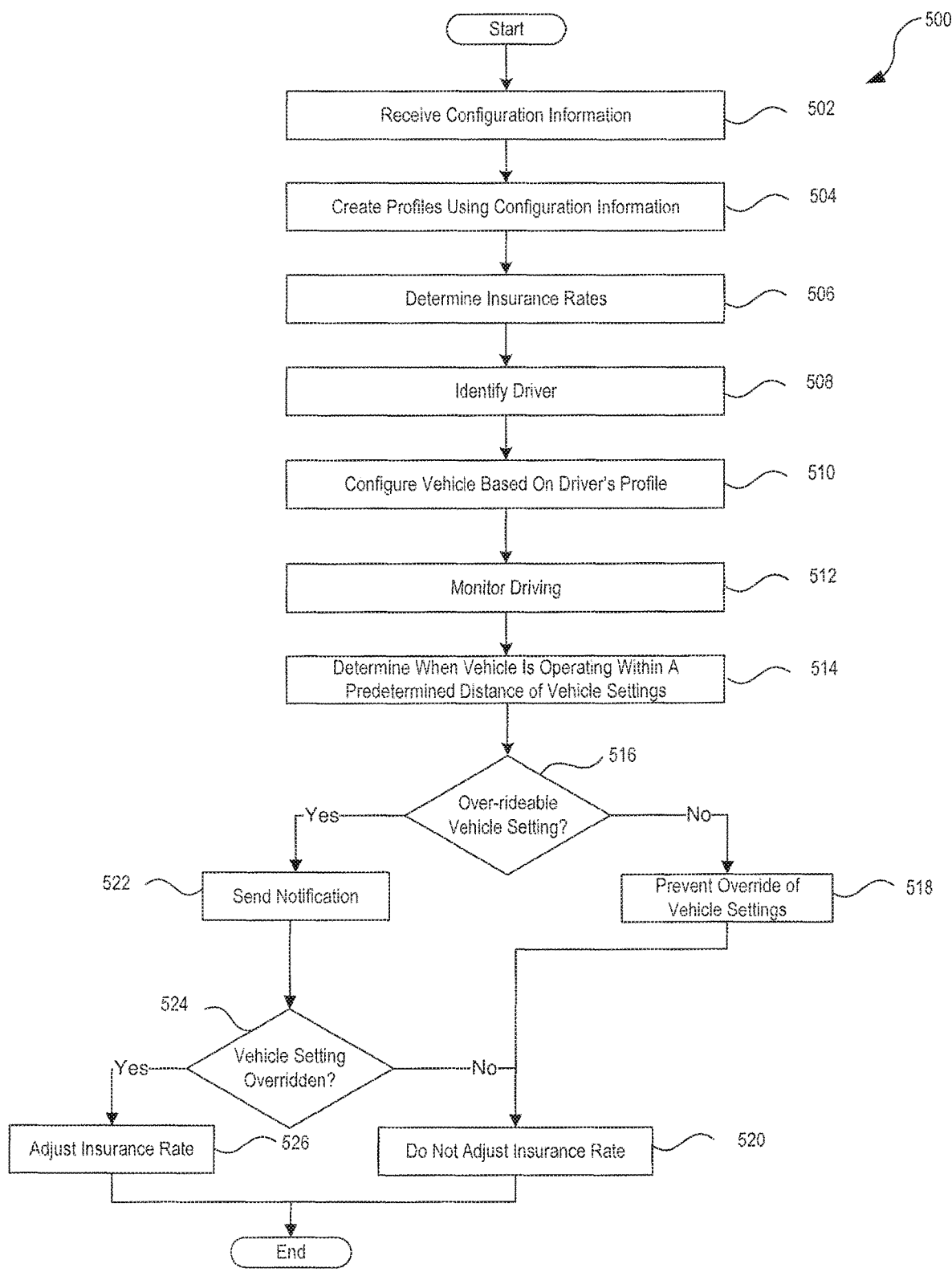
FIG. 5 is a flowchart illustrating a set of operations for configuring a vehicle in accordance with various embodiments of the disclosure.

FIGS. 4-5 are flowcharts illustrating sets of operations for configuring a vehicle. In some embodiments, fewer than all of the operations in each set of operations are performed, whereas in other embodiments additional operations are performed. Moreover, in some embodiments, the operations may be performed in different orders or in parallel. The operations can be performed by device 110 illustrated in FIG. 2, vehicle 135, and/or various components of vehicle configuration platform 120 illustrated in FIG. 3.

FIG. 4 is a flowchart illustrating a set of operations 400 for configuring a vehicle. Receiving operation 402 receives policy terms, including the configuration settings for a vehicle. Configuration settings may include over-rideable settings and non-over-rideable settings. Configuring operation 404 configures the vehicle according to the policy terms. Adjusting operation 406 adjusts the insurance rates according to configuration settings. The rates may be adjusted if the configuration settings are changed and/or if an over-rideable setting is overridden.

FIG. 5 is a flowchart illustrating a set of operations 500 for configuring a vehicle. Receiving operation 502 receives policy terms, including the configuration settings for a vehicle. The profiles may be received on a per driver basis, per vehicle basis, per policy basis, or any combination thereof. Creating operation 504 creates profiles for each person, vehicle, and/or policy based on the received configurations. Determining operation 506 determines an insurance rate based on the configuration settings. For example, when the settings decrease the likelihood of an accident, the insurance rates are decreased.

Identifying operation 508 identifies the driver when a person is preparing to drive the vehicle. The driver may be identified by sensors in the vehicle (e.g., weight sensor, camera, video camera, fingerprint analyzer). The driver may have a unique key that allows the driver to get into the car and/or start the car. In some embodiments, the driver may place their mobile device in a certain port in the vehicle, alerting the vehicle and/or vehicle configuration platform 120 of the identity of the driver. In other embodiments, the vehicle detects that the vehicle will be in self-driving mode (i.e., no human driver).

Configuring operation 510 configures the vehicle based on a profile associated with the driver. For example, if the profile specifies a maximum speed limit of 72 miles per hour in a 75 miles per hour zone, the vehicle will be configured such that the vehicle cannot accelerate above 72 miles per hour when the speed limit is 75 miles per hour. If the driver cannot be identified, a protocol consistent with the insurance policy may be followed. For example, the policy may indicate that a default profile should be used when the driver cannot be identified. Or, the policy may indicate that the vehicle should be configured such that an unidentified driver or a driver without a profile cannot drive the vehicle. In some embodiments, over-rideable vehicle settings may be included in the configuration. For example, a configuration setting may include only driving within a twenty mile radius of the driver's residence. If this vehicle setting is over-rideable, then the driver may drive outside of this radius, but warnings may be sent as the vehicle approaches the radius and should the driver drive outside of the radius, then the rates of the insurance policy may be increased. Alternatively, the driver may not be insured outside of the radius.

Monitoring operation 512 monitors the vehicle. The monitoring may be done by a network of sensors within the vehicle (e.g., speed sensor, volume sensor) and outside the vehicle (e.g., GPS, drone). Monitoring operation 512 may also collect data on the number of attempts to override the configured settings. In some embodiments, only over-rideable settings are monitored and detected. Monitoring operation 512 may provide information to the vehicle, a user device, and/or vehicle configuration platform 120.

Determining operation 514 uses the information from monitoring operation 512 and detects when a vehicle is approaching a configuration setting within a predetermined distance/threshold. For example, if the configured distance setting is a 20 mile radius from the driver's residence, then the network of detectors may determine when the vehicle is within 5 miles of the radius. Decision block 516 determines whether the vehicle setting that is being approached is an over-rideable vehicle setting. If the vehicle setting that is being approached is not an over-rideable vehicle setting (i.e., the driver will be prevented from overriding the vehicle setting), then the system prevents an override of the vehicle setting in preventing operation 518. Since nothing was changed with the policy, rates operation 520 keeps the insurance rates the same.

On the other hand, if decision block 516 determines that the vehicle setting that is being approached (or has been overridden) is an over-rideable vehicle setting, then decision block 516 sends a notification to the driver (e.g., via a user device or the vehicle) and/or the policyholder in notifying operation 522. The notification can be sent or received in any manner (e.g., text message, message via stereo system of vehicle or display in vehicle, email). Decision block 524 determines whether the vehicle setting has been overridden. If the vehicle setting has been overridden, adjusting operation 526 adjusts the insurance rate for the policy to reflect the risky behavior. In some embodiments, the policy can be cancelled. If decision block 524 determines that the vehicle setting has not been overridden, then decision block branches to rates operation 520, where the insurance rate is unchanged.

Computer System Overview

Figure 6:
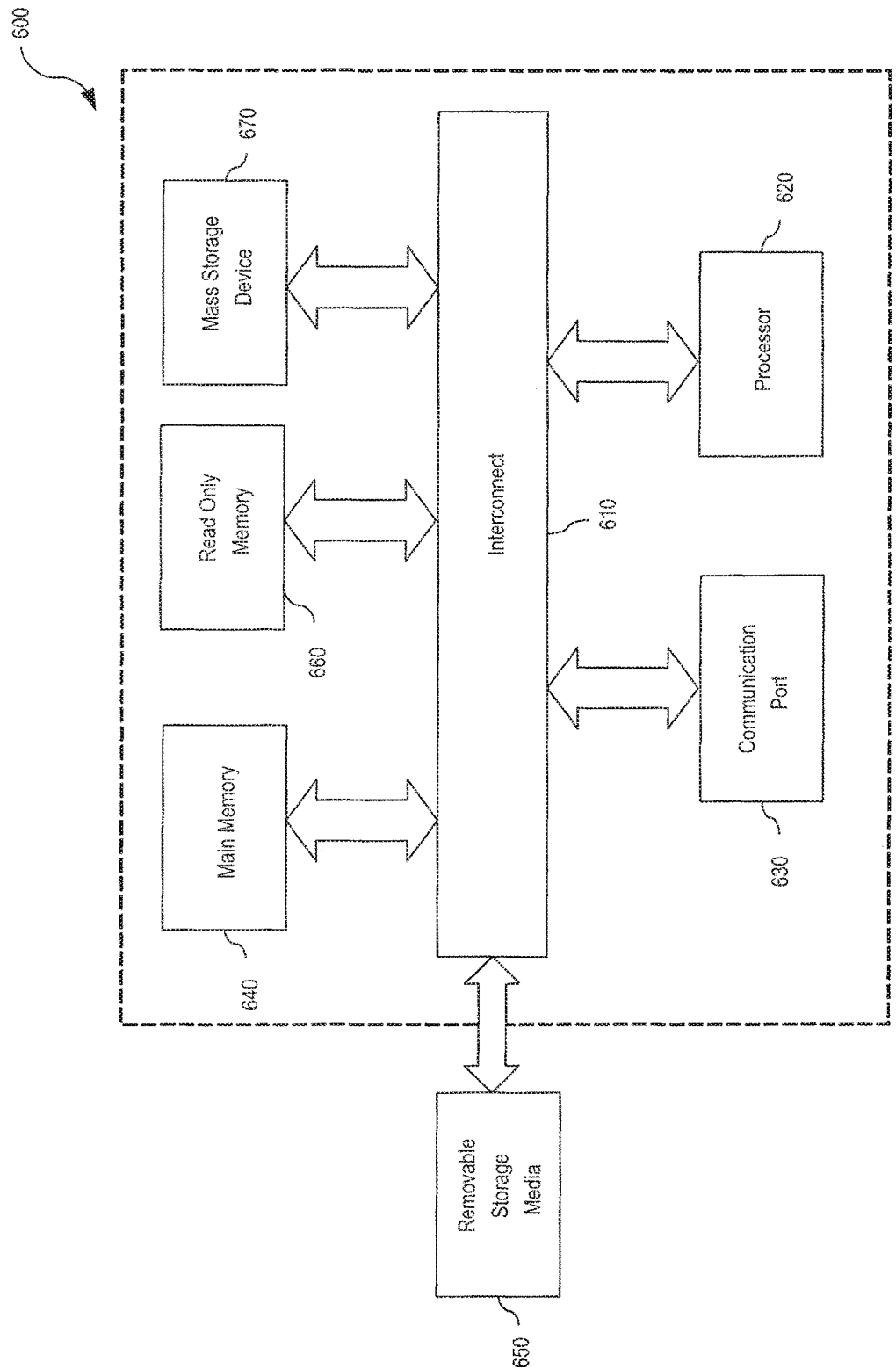
FIG. 6 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, the computer system includes an interconnect 610, at least one processor 620, at least one communication port 630, a main memory 640, a removable storage media 650, a read only memory 660, and a mass storage 670.

Processor(s) 620 can be any known processor, such as, but not limited to, an Intel® Itanium® or Itanium 2® processor(s), or AMD® Opteron® or Athlon MP® processor(s), or Motorola® lines of processors. Communication port(s) 630 can be any of an RS-232 port for use with a modem-based dialup connection, a 10/100 Ethernet port, or a Gigabit port using copper or fiber. Communication port(s) 630 may be chosen depending on a network such a Local Area Network (LAN), Wide Area Network (WAN), or any network to which the computer system 600 connects.

Main memory 640 can be Random Access Memory (RAM) or any other dynamic storage device(s) commonly known in the art. Read only memory 660 can be any static storage device(s) such as Programmable Read Only Memory (PROM) chips for storing static information, such as instructions for processor 620.

Mass storage 670 can be used to store information and instructions. For example, hard disks such as the Adaptec® family of SCSI drives, an optical disc, an array of disks such as RAID, the Adaptec family of RAID drives, or any other mass storage devices may be used.

Interconnect 610 communicatively couples processor(s) 620 with the other memory, storage, and communication blocks. Interconnect 610 can be a PCI/PCI-X- or SCSI-based system bus, depending on the storage devices used.

Removable storage media 650 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for configuring a vehicle. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
   identifying a human operator of a vehicle, the human operator having a profile indicating vehicle settings,
      wherein the vehicle is covered by an insurance policy based at least in part on the vehicle settings,
      wherein the human operator is not a policyholder of the insurance policy;
      wherein the human operator of the vehicle is identified by collecting unique identification information associated with the human operator;
   generating, by a processor, an insurance rate in the insurance policy for insuring the vehicle based at least in part on the vehicle settings in the profile;
   detecting that the human operator has overridden one or more individual settings of the vehicle settings; and
   in response to detecting that the human operator has overridden the one or more individual settings of the vehicle settings:
      adjusting, by the processor, insurance coverage or the insurance rate in the insurance policy in real-time to reflect the override of the one or more individual settings, and
      sending a message to a device associated with the policyholder regarding the override of the one or more individual settings,
         wherein the message includes an option for the policyholder to update the vehicle settings for the human operator.

2. The method of claim 1, wherein the vehicle settings include at least one of: headlight status, maximum speed limit, maximum stereo volume, maximum temperature, number of passengers, or geographical limitations.

3. The method of claim 1, wherein the vehicle settings include a maximum temperature inside the vehicle.

4. The method of claim 1, wherein the vehicle settings include at least one non-over-rideable vehicle setting, wherein the non-over-rideable vehicle setting cannot be overridden by the human operator.

5. The method of claim 1, wherein identifying the human operator of the vehicle comprises receiving, from the vehicle, biometric information collected from the human operator.

6. The method of claim 1, wherein when the human operator cannot be identified or does not have the profile:
   assigning a default profile to the human operator; and
   configuring the vehicle with the vehicle settings in the default profile.

7. The method of claim 1, further comprising receiving the vehicle settings in the profile from the policyholder of the insurance policy via a graphical user interface, wherein the graphical user interface displays configurable vehicle settings and insurance rates, wherein the insurance rates increase or decrease when the configurable vehicle settings are configured.

8. A configurable vehicle comprising:
   a network of detectors configured to:
      monitor vehicle operations relating to vehicle settings of the configurable vehicle, and
      send vehicle operational information related to the vehicle operations to a configuration system; and
   the configuration system comprising:
      a memory,
      a processor, and
      a vehicle configuration module, running on the processor, to:
         configure the configurable vehicle with the vehicle settings according to an identity of a human operator,
            wherein the configurable vehicle is covered by an insurance policy based at least in part on the vehicle settings,
            wherein the human operator is not a policyholder of the insurance policy,
            wherein the human operator of the vehicle is identified by collecting unique identification information associated with the human operator,
         process the vehicle operational information from the network of detectors,
         detect that the human operator has overridden one or more individual settings of the vehicle settings;
         in response to detecting that the human operator has overridden the one or more individual settings of the vehicle settings:
            adjust insurance coverage or an insurance rate in the insurance policy in real-time to reflect the override of the one or more individual settings, and
            send a message to a device associated with the policyholder regarding the override of the one or more individual settings,
               wherein the message includes an option for the policyholder to update the vehicle settings for the human operator.

9. The configurable vehicle of claim 8, wherein the vehicle settings include at least one of a number of passengers or a headlight status.

10. The configurable vehicle of claim 8, wherein the insurance policy covering the configurable vehicle is priced according to the vehicle settings.

11. The configurable vehicle of claim 8, further comprising a human operator identification system, running on the processor, to:
   send the identifying information to a server, and
   receive the vehicle settings from the server.

12. The configurable vehicle of claim 8, wherein the vehicle settings include a maximum stereo volume.

13. The configurable vehicle of claim 12, wherein the vehicle configuration module further:
   selects the maximum stereo volume by adjusting the stereo volume; and
   indicates a change in the insurance policy as the stereo volume is adjusted.

14. A non-transitory computer-readable storage medium comprising a set of instructions that, when executed by one or more processors, cause the one or more processors to:
   configure a vehicle with vehicle settings according to an identity of a human operator,
      wherein the vehicle is covered by an insurance policy based at least in part on the vehicle settings,
      wherein the human operator is not a policyholder of the insurance policy,
      wherein the human operator of the vehicle is identified by collecting unique identification information associated with the human operator,
   detect that the human operator has overridden one or more individual settings of the vehicle settings,
   in response to detecting that the human operator has overridden the one or more individual settings of the vehicle settings:
      adjust insurance coverage or an insurance rate in the insurance policy in real-time to reflect the override of the one or more individual settings, and
      send a message to a device associated with the policyholder regarding the override of the one or more individual settings,
         wherein the message includes an option for the policyholder to update the vehicle settings for the human operator.

15. The non-transitory computer-readable storage medium of claim 14, wherein the set of instructions, when executed by the one or more processors, further cause the one or more processors to compare vehicle operational information with the vehicle settings to determine whether the vehicle is operating within a threshold of the vehicle settings.

16. The non-transitory computer-readable storage medium of claim 15, wherein the set of instructions, when executed by the one or more processors, further cause the one or more processors to notify the human operator or the policyholder of the insurance policy covering the vehicle that the vehicle is operating within the threshold of the vehicle settings in response to determining that the vehicle is operating within the threshold of the vehicle settings.

17. The non-transitory computer-readable storage medium of claim 14, wherein the vehicle can have multiple possible human operators, each human operator of the multiple possible human operators of the vehicle having separate vehicle settings for the vehicle.

18. The non-transitory computer-readable storage medium of claim 14, wherein the vehicle settings includes a maximum number of passengers.

* * * * *